Jan. 13, 1970 K. B. HARPER 3,489,417

RECORD PLAYER

Filed May 23, 1967 2 Sheets-Sheet 1

INVENTOR.
Kenneth B. Harper,
BY Parker & Carter
Attorneys.

Jan. 13, 1970 K. B. HARPER 3,489,417

RECORD PLAYER

Filed May 23, 1967 2 Sheets-Sheet 2

INVENTOR.
Kenneth B. Harper,
BY Parker & Carter
Attorneys.

United States Patent Office 3,489,417

Patented Jan. 13, 1970

3,489,417

RECORD PLAYER

Kenneth B. Harper, 1555 Hickory Lane, Winnetka, Ill. 60093

Filed May 23, 1967, Ser. No. 640,524

Int. Cl. G11b *5/00*

U.S. Cl. 284—4 6 Claims

ABSTRACT OF THE DISCLOSURE

A tape record player having an abutment movable against a tape cartridge to separate the playing roller from the capstan drive in response to cessation of electrical energy supplied to the player, the abutment being yieldingly urged into engagement with the capstan for movement by the inertia of the flywheel and being held out of said engagement by said electrical energy.

This invention relates to devices for playing tape records and has particular relation to stereo players into which tape record-containing cartridges are inserted.

One purpose of the invention is to provide a record player capable of receiving record cartridges of varying configuration.

Another purpose is to provide a converter accessory enabling the employment in the player of the invention of a cartridge designed for reception in a differing player.

Another purpose is to provide a record player capable of obviating the need for restricting the employment of specific cartridges with specific players.

Another purpose is to provide a record player effective automatically to eject record-containing cartridges upon cessation of power to the player.

Another purpose is to provide a record player of maximum simplicity and economy in construction and use.

Another purpose is to provide a record player requiring a minimum number of steps or actions by the user in its employment.

Another purpose is to provide means insuring against the deformation of cartridge tape transporting rollers.

Another purpose is to provide a cartridge record player free of any requirement for manual removal of the cartridge after each period of player operation.

Other purposes will appear from time to time during the course of the specification and claims.

The invention is illustrated more or less diagrammatically in the drawings herein as follows.

Like parts are indicated by like numerals throughout the specification and drawings.

Figures 1, 2, 6, 7, 8:
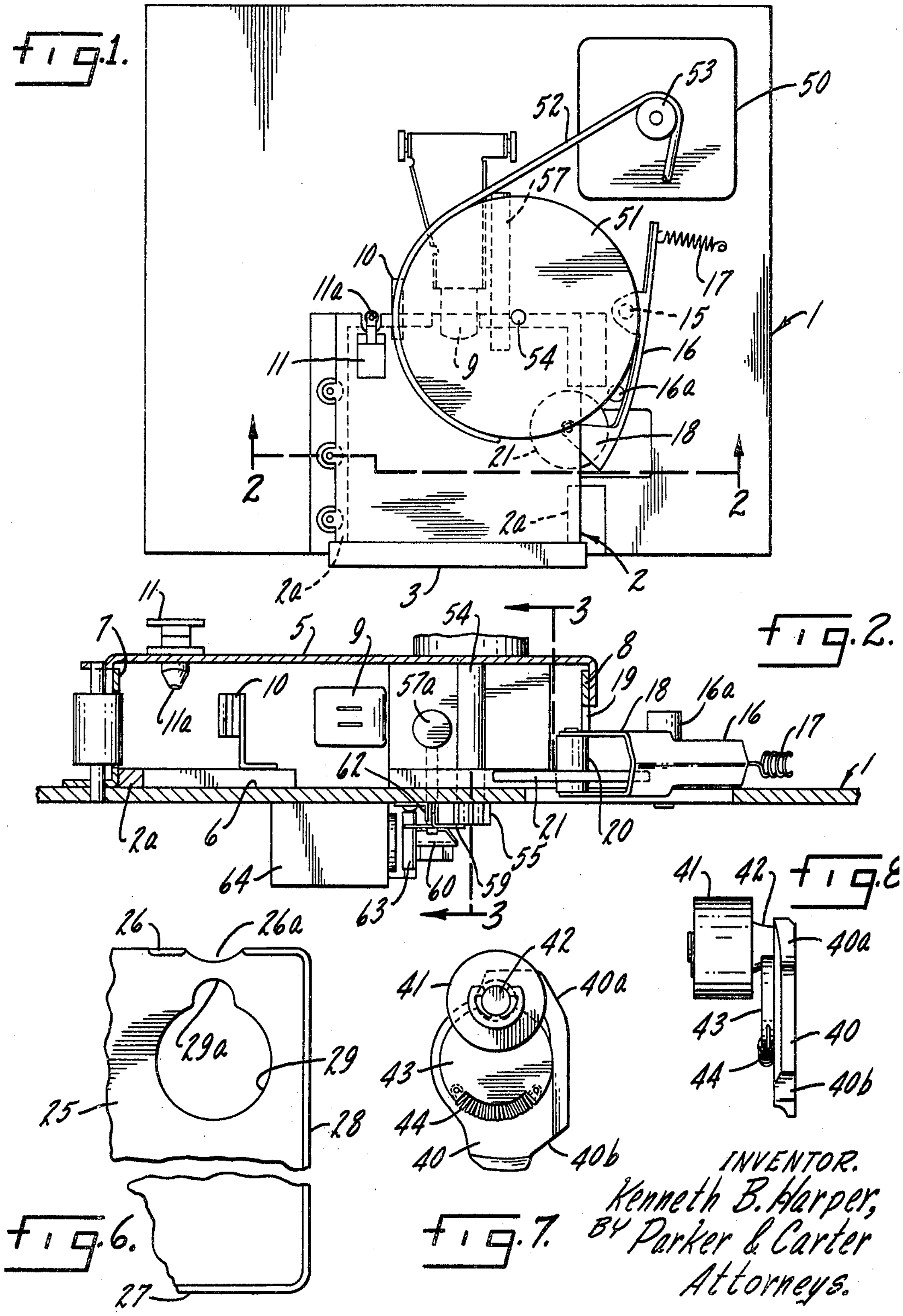
FIGURE 1 is a top plan view.
FIGURE 2 is a partial view taken on the line 2—2 of FIGURE 1.
FIGURE 6 is a partial view of another form of cartridge.
FIGURE 7 is a top view of an accessory element.
FIGURE 8 is a side view of the structure of FIGURE 7.

Referring now to the drawings, a base is indicated generally by the numeral 1. Carried on or as a part of the base 1 is a cartridge-receiving housing 2. The housing has an open end 3 toward which an upwardly inclined guide ramp 4 may be directed. Housing 2 may conveniently comprise an upper wall 5, a lower wall 6 and longitudinal side walls 7, 8. Longitudinal rails 2*a* lie along the lower portions of side walls 7, 8. The end portion of housing 2 opposite the mouth 3 is open or apertured to provide for positioning of a record playing head 9 and a track changer member 10. Since the members 9 and 10, and similar items such as track sensors (not shown) for example, are well known and may be of conventional construction, the details of same forming no portion of the present invention, they need be no further described in detail herein. Indicated at 11 is a suitable switch having a contact arm 11*a* for actuation by a cartridge inserted in housing 2. It will, of course, be understood that a cartridge inserted into housing 2 has end openings effective to present the record carried in said cartridge to the members 9 and 10 as the record moves through the cartridge and across the open end of housing 2 opposite the mouth 3.

Pivoted at 15 is an arm 16. A spring 17 is secured to base 1 and to one end of arm 16 to urge the opposite end 18 of arm 16 toward the housing 2 and toward an aperture 19 therein. Stop 16*a* limits travel of portion 18 toward opening 19. Rotatably carried by the end 18 of arm 16 is a roller having a first, smaller diameter, as indicated at 20, above the upper surface of rails 2*a* and a second larger diameter, as indicated at 21, below said rail surface.

Figure 5:
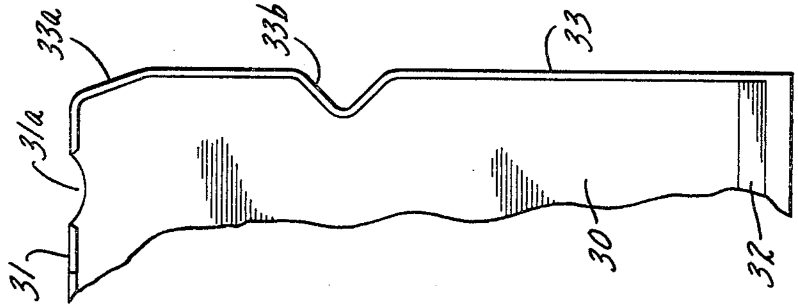
FIGURE 5 is a partial view of one form of cartridge.

Indicated in FIGURES 5 and 6 are portions of two types of generally available record-playing cartridges. For example, in FIGURE 6 a lower wall 25 and end walls 26, 27 of one type of cartridge are shown partially. A side wall 28 is of continuous, straight outer surface and the cartridge has substantially square or slightly rounded corners. The bottom wall 25 is apertured as indicated at 29, the aperture 29 having a forward offset 29*a*. The cartridge shown in FIGURE 5 similarly has a bottom wall 30 and end walls 31, 32 shown partially. The side wall 33 of the cartridge in FIGURE 5, however, has a forward, angularly disposed or canted end of corner portion 33*a* in place of a sharp or slightly rounded corner and the wall 33 has a substantial recess 33*b* intermediate its ends, the forward walls of recess 33*b* being inclined forwardly from the recess base to side wall 33. The bottom wall 30 of cartridge in FIGURE 5 is not apertured as indicated at 29 in FIGURE 6. The cartridges of both FIGURES 5 and 6 have their forward end walls apertured as required for exposure of the tape carried in the cartridge. In FIGURES 6 and 5, for example, the apertures 26*a*, 31*a*, respectively, provide access for a drive roller or capstan to engage the tape and a transporting roller on which the tape record turns.

Illustrated in FIGURES 7 and 8 is an accessory for use with the cartridge of the type shown in FIGURE 6. The said accessory includes a base 40 on which a roller 41 is rotatably carried on a shaft 42. A rise 43 is designed for insertion into and seating within the opening 29. A coiled pressure element 44 lies along a rearward portion of the side wall of rise 43 for insertion into opening 29 and for frictional retention within the opening 29. The base 40, designed for engagement with the lower outer surface of bottom wall 25, has a forward inclined or canted corner surface 40*a* and a rearwardly positioned recessed wall segment 40*b*.

Referring now to FIGURES 1–4, a drive motor is illustrated at 50. A flywheel 51 is driven by motor 50 through the mediacy of continuous belt 52 and drive pulley 53. A capstan shaft 54 is secured to flywheel 51 and extends through the housing 2, carrying beneath housing 2 a pinion or tooth member 55 with the intermediate capstan portion of shaft 54 being positioned for engagement by the tape and transport roller to produce movement in the cartridge in response to rotation of shaft 54.

A boss 56 is upstanding on base 1 and a shaft 57 is slidable and rotatable therein, presenting an end surface 57*a* to the forward wall of a cartridge inserted into housing 2. Depending legs 58 extend from shaft 57 through openings in base 1 for engagement in slots 58*a* of a rack bar or ejector member 59. The rack bar 59 and shaft 57 parallel the longitudinal axis of housing 2. A spring 57*b* engages leg 58 and bar 59. A first leaf spring means, such as the leaf spring 60 urges rack bar 59 upwardly or toward base 1. Bar 59 carries an upwardly disposed ear 59*a* having an inclined forward surface. An opening is formed in the base 1 and has a similarly inclined surface 61 positioned for engagement with the inclined forward surface of ear 59*a* when the ear 59*a* is moved toward housing mouth 3.

Member 59 has a toothed edge portion 59*b* positioned for engagement with the teeth of pinion 55. An abutment 62 extends beneath base 1 on the opposite side of rack bar 59 from pinion 55 to insure retention of the teeth 59*b* in engagement with those of the pinion 55 as further described hereinbelow. A yielding means, such as the leaf spring 63, urges rack bar 59 in a direction effective to urge teeth 59*b* toward engagement with those of pinion 55. A suitable electrical means, such as the relay 64, is positioned at one side of bar 59 to draw the bar 59 when electrical power is supplied to element 64 and thus to maintain disengagement of the teeth 59*b* from those of pinion 55. Since abutment 62 precludes sideways escape of teeth 59*b* from pinion 55, the spring 63 is not relied upon to hold said teeth in engagement. Hence element 64 can be an element requiring very little power, being required to overcome only the light spring 63. The rotatability of shaft 57 in boss 56 permits sideways movement of member 59 when teeth 59*b* are disengaged from pinion 55.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

If a cartridge corresponding generally to that illustrated in FIGURE 5 is to be employed, the operator inserts the same in opening 3 for full travel into housing 2. In such event the opposite lower longitudinal edges of the cartridge ride on rails 2*a* as best seen, for example, in FIGURE 2 and in dotted lines in FIGURE 1. The surface 33*a* will, in such event, contact roller portion 20 and will move the same out of the way to permit the side surface 33 of the cartridge to ride along within the opposed side wall surface of housing 2. When the cartridge has been fully inserted into housing 2 the recess 33*b* will have reached alignment with opening 19 in the side wall of housing 2 and the roller portion 20 will engage in the recess 33*b* to retain the cartridge in playing position within the housing 2 and to retain the cartridge-contained pinch or tape-transporting roller (not shown), over which the tape record turns, into engagement with the driving shaft or roller 54 of the player, whereby rotation of shaft 54 against the tape and roller carried by the cartridge will result in movement of the tape across the playing head 9. The inclined forward surface of recess 33*b*, coupled with the strength of spring 17, is effective to maintain the required pressure of the playing or pinch roller against the driving shaft.

The type of cartridge illustrated in FIGURE 6 is normally employed with a player having a playing or pinch roller positioned for insertion into opening 29 in response to insertion of the cartridge into the housing 2. Illustrated in FIGURES 7 and 8 is an accessory effective to permit the employment of the cartridge of FIGURE 6 in the player of the present invention with the same ease and manner of operation as that above described with respect to the cartridge of FIGURE 5. The operator merely inserts roller 41 into opening 29 to bring the rise 43 and coiled friction element 44 into the opening 29 and the base 40 into engagement with the undersurface of the cartridge, the roller shaft 42 fitting into offset 29*a*. The element 44 insures a forward positioning of roller 41 against the tape and for engagement by the driving shaft 54 when the same has entered aperture 26*a* as a result of full insertion of the cartridge in housing 2. When the cartridge of FIGURE 6 is inserted, the opposite lower longitudinal edges thereof ride on rails 2*a* but the base 40 extends therebelow. Hence the inclined forward edge surface 40*a* engages the larger roller 21 to move it and roller 20 out of impeding position. When the cartridge has been fully inserted, however, the roller 21 engages the recess 40*b*, the forwardly inclined surface of which is effective, in conjunction with the force of spring 17, to hold the cartridge in desired position and to urge the playing roller 41 and the tape riding thereon into driving relationship with the driving shaft 54.

Figure 3:
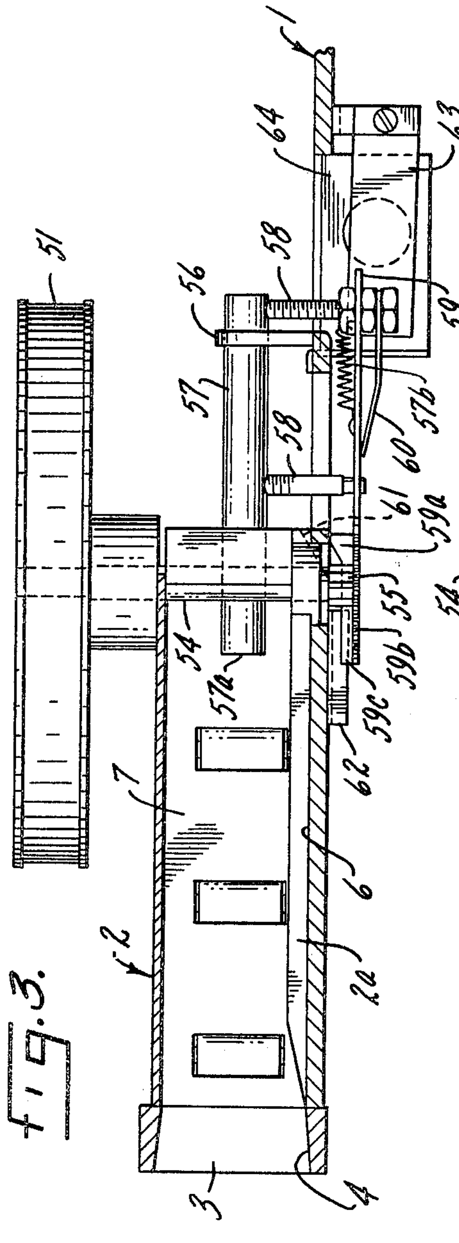
FIGURE 3 is a view taken on the line 3—3 of FIGURE 2.
Figure 4:
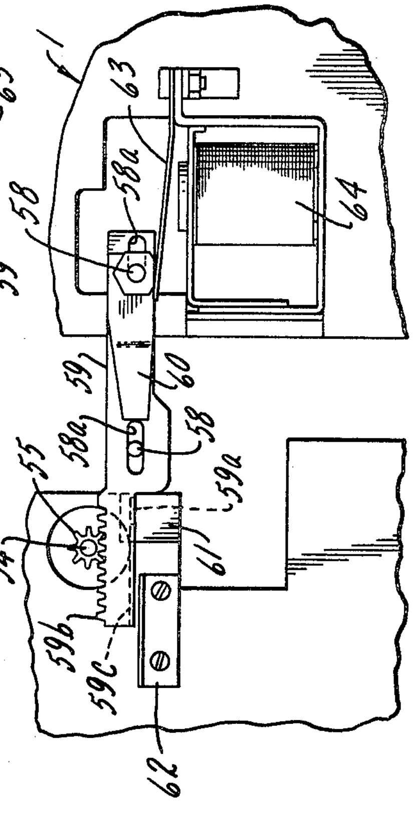
FIGURE 4 is a detail bottom view.

The structure of FIGURES 3 and 4 enables the employment of the inertia or momentum remaining in flywheel 51 to insure automatic, mechanical rejection of the cartridge from playing position in response to any cessation of power to the player. For example, automobile stereo tape record players in general use are supplied with power when the ignition switch of the automobile is engaged. Such record players may employ the insertion and removal of the cartridge to actuate an "on-off" switch 11 for the player itself. Others may employ a separately, manually actuatable "on-off" switch. In either event, failure to remove the cartridge from the player, upon disengagement of either the automobile ignition switch or of a separate "on-off" switch, leaves the playing or pinch roller in pressure engagement with the driving shaft or capstan, such as shaft 54. Such engagement, continued over a sufficient period, produces a "flat" or deformed segment of the playing or transporting roller. While operation of the cartridge thereafter for substantial time will tend to re-form the roller, operation of the cartridge during such time produces an irregular tape transport and an unsatisfactory audio result. The structure of FIGURES 3 and 4 provides an automatic, mechanical and insured disengagement of the playing roller from the driving shaft 54 whenever power is removed from the player, regardless of the reason or manner in which such removal is effected.

When a cartridge is inserted in housing 2, the forward edge of the cartridge engages the opposed end surface 57*a* of shaft 57 and moves the shaft 57 ahead of the cartridge and away from housing 2. Through the mediacy of legs 58, the rack bar 59 is moved in the same direction. Similarly, the supply of power from whatever source, delivered for example upon cartridge contact with an arm 11*a*, energizes element 64 to draw the bar 59 to one side, i.e. to the left as the parts are shown in FIGURE 2, to insure against engagement of the teeth 59*b* with those of pinion 55. Thus, while the record is playing and flywheel 51 and pinion 55 are rotating throughout such play, the rack bar 59 and shaft 57 are rendered inactive and held, as it were, in a "parked" or cocked position.

Upon cessation of power, in any manner, to the player of the invention, member 64 is deactivated. Thereupon spring means 63 moves bar 59 sideways, shaft 57 being pivoted, in effect, in boss 56, to engage the distal teeth 59*b* of bar 59 with the teeth of pinion 55. At this point, while power is no longer supplied to motor 50, flywheel 51 is continuing to rotate under its substantial momentum. Such rotation of flywheel 51 and pinion 55 secured thereto produces a linear motion of rack bar 59 and thus of shaft 57 toward the opening 3 and the surface 57*a* of shaft 57 will move the cartridge outwardly of housing 2 a sufficient distance to disengage the playing roller from the driving shaft 54. It will be understood that such ejection movement need be of comparatively short distance. Such outward travel of the cartridge may, if desired, be extended beyond that required to insure separation of the playing roller from the driving shaft in order to alert the user to the fact that the cartridge is not, in fact, in playing position. It is not, however, intended or necessary to completely discharge the cartridge from the housing 2, though the same may be easily accomplished, as will be apparent.

When the rack bar 59 has been moved a predetermined desired distance in ejection direction, the ear 59a will engage, under the influence of spring 60, the surface 61. Continued movement of rack bar 59 for a further predetermined distance will, due to the engagement of opposed inclined surfaces of ear 59*a* and 61, produce a downward movement of rack bar 59 to disengage the teeth 59*b* downwardly from those of pinion 55. Thereupon the spring 63 will move the rack bar 59 further in the direction of pinion 55 and the rack bar 59 will underlie the pinion 55, bar 59 having an upstanding linear wall portion 59*c*, of smooth surface, engagable at this point with the toothed surface of pinion 55 to limit the movement of rack 59 beneath pinion 55. Thus bar 59 is positioned for free retraction or repositioning in response to insertion of a new cartridge, with no possibility of engagement of teeth 59*b* with pinion 55. Bar 59 thus moves in parallel with the axis of shaft 57 during ejection, but bar 59 is movable off the center line of shaft 57 at each end of its travel, at one end by member 64 and at the other by elements 59*a*, 61, 60 and 63. Thus the structure of FIGURES 3 and 4 constitutes both a rotary-to-linear motion converter and a clutch assembly. The abutment 62 insures engagement of the teeth 59*b* when desired and is of sufficiently limited extension to permit sideways movement of bar 59, in response to element 64, when the bar 59 has been retracted a predetermined distance. It will be understood than an "on-off" switch, such as that shown at 11, may be positioned for actuation by the cartridge when a cartridge reaches playing position, i.e. when a playing roller is engaged with the driving shaft 54. Such switches and the positioning thereof may vary slightly. Due to such variance, means are provided to insure that bar 59 is withdrawn into a position free of the guide 62 so that activation of element 64 will produce the desired sideways movement of rack bar 59 into cocked position upon delivery of power to the element 64. The lost-motion connection of legs 58 and bar 59 provided by slots 58*a* and the effect of spring 57*b* is such as to insure flexibility while providing movement of bar 59 out of alignment with abutment guide 62 before 64 is energized.

There is claimed:

1. In a record player, a cartridge-receiving housing, a flywheel, motor means having a driving engagement with said flywheel for driving said flywheel when electrical energy is supplied to said motor means, a tooth member carried by said flywheel and rotatable therewith, an abutment positioned for engagement and movement by a cartridge inserted in said housing, an ejector member positioned for movement with said abutment, electrical means for holding said ejector member out of engagement with said tooth member in response to delivery of electrical energy to said player, yielding means urging said ejector member into engagement with said tooth member in response to withdrawal of electrical energy from said player, whereby inertial rotation of said flywheel and tooth member moves said ejector member, abutment and cartridge in a direction outwardly of said housing.

2. The structure of claim 1 characterized by and including an ear on said ejector member, an inclined surface on said housing positioned for engagement by said ear when said ejector member has traveled a predetermined distance in said direction and means urging said ear toward said housing surface to separate said ejector member from said tooth member.

3. The structure of claim 1 characterized by and including opposed, inclined surfaces on said ejector member and said housing, a second yielding means engaging said ejector member to urge said surfaces into engagement with each other, said first yielding means being effective to move said ejector member beneath said tooth member when said surfaces have been engaged for a predetermined period to separate said ejector and tooth members.

4. The structure of claim 1 characterized by and including a guide spaced from said tooth member and effective to hold said ejector member in engagement with said tooth member when said ejector member is between said guide and said tooth member.

5. In a record player, a flywheel and means for rotating it, electrical means for supplying electrical energy to said flywheel rotating means, a capstan drivingly connected to said flywheel, a cartridge-receiving housing and an ejector mechanism positioned to engage and move a cartridge in a direction outwardly of said housing, said ejector mechanism being movable into engagement with said capstan in response to cessation of said electrical energy supply for movement of said cartridge in said direction in response to momentum in said flywheel.

6. The structure of claim 5 characterized said electrical means holding said ejector mechanism out of engagement with said capstan while electrical energy is supplied to said flywheel rotating means and yielding means urging said ejector mechanism and capstan into engagement with each other in response to cessation of said electrical energy supply.

References Cited

UNITED STATES PATENTS

| | | | |
|---|---|---|---|
| 3,400,227 | 9/1968 | Lear et al. | 179—100.2 |
| 3,301,564 | 1/1967 | Platt | 242—55.13 |
| 3,009,024 | 11/1961 | Gash | 179—100.2 |

LEONARD FORMAN, Primary Examiner

R. A. FIELDS, Assistant Examiner